United States Patent [19]
Hergenrother et al.

[11] 4,440,889
[45] Apr. 3, 1984

[54] POLYETHYLENE TEREPHTHALATE MOLDING COMPOSITIONS

[75] Inventors: William L. Hergenrother; John M. Doshak, both of Akron, Ohio

[73] Assignee: The Firestone Tire & Rubber Company, Akron, Ohio

[21] Appl. No.: 391,200

[22] Filed: Jun. 23, 1982

[51] Int. Cl.³ ............................................. C08K 5/52
[52] U.S. Cl. .................................... 524/143; 524/141; 524/284; 524/292; 524/425; 524/442; 524/297; 524/450; 524/462; 524/296; 524/298
[58] Field of Search ............... 524/141, 143, 292, 295, 524/296, 297, 284, 425, 442, 450, 462, 298

[56] References Cited

U.S. PATENT DOCUMENTS 3,368,995  2/1968  Furukawa et al. ................. 524/396
3,435,093  3/1969  Cope .................................... 525/176
4,234,708  11/1980  Edelman et al. .................... 528/309
4,284,540  8/1981  Iida et al. ............................ 524/400

*Primary Examiner*—Joseph L. Schofer
*Assistant Examiner*—Judy M. Reddick
*Attorney, Agent, or Firm*—Frank J. Troy, Sr.

[57] ABSTRACT

Polyethylene terephthalate molding compositions are provided which comprise a polyethylene terephthalate having an inherent viscosity of at least 0.4, a plasticizer, a lubricating polymer, a nucleating agent, a reinforcing agent or mixture of reinforcing agent and filler, and a molecular weight reducing agent for the polyethylene terephthalate. The molding compositions can be injection molded utilizing mold temperatures below 100° C. (e.g., 60°–90° C.). The molded compositions exhibit an excellent balance of properties such as tensile strength, flex modulus, heat distortion temperature and impact strength.

8 Claims, No Drawings

POLYETHYLENE TEREPHTHALATE MOLDING COMPOSITIONS

BACKGROUND OF THE INVENTION

The invention relates to polyethylene terephthalate molding compositions. More particularly, the invention relates to polyethylene terephthalate molding compositions which in addition to plasticizers, nucleating agents and reinforcing agents or mixtures thereof with fillers contain molecular weight reducing agents for the polyethylene terephthalate.

Polyethylene terephthalate has been widely used for some time for fibers and films. However, the polymer has not yet achieved wide commercial acceptance for use as a molding material. Several factors have contributed to the lack of commercial acceptance of this polymer for use as a molding material. The major factors relate to the slow rate of crystallization and lack of roughness of polyethylene terephthalate.

Thus, polyethylene terephthalate has a slow rate of crystallization as compared to other moldable crystalline polymers. This has resulted in great difficulty in preparing molded articles having uniform properties and surface characteristics from this polymer using conventional molding temperatures (i.e., 70°-100° C.) and molding cycles. The use of higher molding temperatures (e.g., 130° C. or more) and longer molding cycles have generally proven to be impractical since most conventional molds are water heated and attain temperatures of only about 110° C. While there are a few oil-heated molds which attain temperatures greater than 110° C., these are generally inconvenient to use and often exhibit uneven heating temperatures.

Recent approaches to the crystallization problem have involved the use of various nucleating agents to promote more rapid crystallization of the polyethylene terephthalate. A wide variety of nucleating agents have been proposed for that purpose in the prior art. Thus, U.S. Pat. No. 4,305,864 describes the use of ionizable metal salts of organic compounds having at least one acidic proton such as the sodium, potassium and lithium salts of carboxylic acids, particularly substituted carboxylic acids of which substituted benzoic acids are preferred. U.S. Pat. No. 4,284,540 refers to known nucleating agents such as benzophenone, inorganic powders and metal soaps. U.S. Pat. No. 4,172,859 refers to nucleating agents such as talc, calcium fluoride, sodium fluoride, alumina and polytetrafluoroethylene. U.S. Pat. No. 3,368,995 refers to nucleating agents which include carbon powders, carbon black, oxides of the metals of Group II of the Periodic Table, sulfates such as $CaSO_4$ and $BaSO_4$, phosphates such as $Ca_3(PO_4)_2$, silicates such as $CaSiO_3$ and $MgSiO_3$, oxalates such as calcium oxalates, stearates such as magnesium stearate, benzoates such as calcium benzoates, salicylates such as zinc salicylate, talc and the neutral clays. British Patent application No. 2,015,013 refers to crystallization promoters which include the sodium or potassium salts of a hydrocarbon acid containing 7 to 25 carbon atoms.

The major approach to the problem of lack of toughness of the polyethylene terephthalate has been to utilize various reinforcing and filler materials, including a reinforcing material such as glass fibers and fillers such as mica, talc, clay and the like. Such materials are described in many of the above-mentioned patents. In addition, it has been proposed to improve the impact strength of polyethylene terephthalate by the addition thereto of a wide variety of polymeric modifiers, including among others acrylic or methacrylic monomer grafted copolymers of conjugated dienes alone or in combination with a vinyl aromatic hydrocarbon or an aromatic polycarbonate resin, see U.S. Pat. No. 4,280,948 and U.S. Pat. No. 4,280,949; copolymers of alpha-olefins and a glycidyl ester of an unsaturated aliphatic carboxylic acid, see U.S. Pat. No. 4,284,540; and the wide variety of rubbery modifiers described in U.S. Pat. No. 4,172,859.

While the polyethylene terephthalate molding compositions described in the above-mentioned patents exhibit desirable properties, in some respects they fail to exhibit the overall balance of properties needed in a fully acceptable molding material. Thus, commercially acceptable polyethylene terephthalate compositions are needed which exhibit an excellent balance of properties including high tensile strength, high flex modulus, high heat distortion temperature and good impact strength.

SUMMARY OF THE INVENTION

In accordance with the present invention, a polyethylene terephthalate molding composition has now been developed which exhibits an excellent balance of properties including tensile strength, flex modulus, distortion temperature and impact strength. The composition comprises:

(a) from about 40 to about 70 parts by weight per 100 parts by weight of total composition of a polyethylene terephthalate having an intrinsic viscosity of at least 0.4 as measured at 25° C. in a 1:1 mixture of phenol and tetrachloroethane;

(b) from about 0.5 to about 5.0 parts by weight per 100 parts by weight of total composition of a plasticizer selected from the group consisting of benzoate esters of polyols, phthalate esters and phosphate esters;

(c) from about 0.5 to about 0.5 to 10.0 parts by weight per 100 parts by weight of total composition of a lubricating polymer;

(d) from about 0.1 to about 5.0 parts by weight by weight per 100 parts by weight of total composition of a nucleating agent;

(e) from about 20 to about 60 parts by weight per 100 parts by weight of total composition of a reinforcing material or mixture of reinforcing material and filler; and (f) from about 0.01 to about 1.0 parts by weight per 100 parts by weight of total composition of a molecular weight reducing agent for said polyethylene terephthalate, wherein said molecular weight reducing agent is selected from the group consisting of benzoic acid, neopentyl glycol and water.

DETAILED DESCRIPTION OF THE INVENTION

The polyethylene terephthalate resins employed in the compositions of the invention can be obtained commercially or they can be prepared by known techniques such as by the alcoholysis of esters of terephthalic acid with ethylene glycols as described in U.S. Pat. Nos. 2,465,319 and 3,047,359 and elsewhere. The polyethylene terephthalate resins employed herein will have intrinsic viscosities of at least 0.4 deciliters per gram (dl/g) and may have intrinsic viscosities of 0.4 to 1.0, preferably 0.45 to 0.55 dl/g as measured in a 1:1 mixture of phenol and tetrachloroethane at 25° C. The amounts of polyethylene terephthalate utilized in the composition may range from 40 to about 70 parts by weight per 100 parts by weight of total composition. Preferred amounts are from 45 to 65 parts by weight of total composition.

As indicated, the plasticizers employed in the compositions of the invention are selected from benzoate esters of polyols, phthalate esters and phosphate esters. Suitable benzoate esters of polyols which may be employed include neopentyl glycol dibenzoate, triethylene glycol dibenzoate, polyethylene glycol dibenzoate, glycerol tribenzoate, pentaerythritol tetrabenzoate, dipropylene glycol dibenzoate, diethylene glycol dibenzoate and the like. Suitable phthalate esters which may be employed include dicyclohexyl phthalate, diphenyl phthalate, dibenzyl phthalate, dioctyl phthalate, butyl benzyl phthalate and the like. Suitable phosphate esters which may be employed include tricresyl phosphate, cresyl diphenyl phosphate, trixylyl phosphate and the like. The preferred plasticizers are the benzoate esters of polyols and of these neopentyl glycol dibenzoate is particularly preferred.

The amounts of plasticizer which may be present in the compositions may range from about 0.5 to about 5.0 parts by weight per 100 parts by weight of total composition. Preferred amounts are from 2.0 to 4.0 parts by weight per 100 parts by weight of total composition.

A wide variety of lubricating polymers may be utilized in the compositions of the invention. Such polymers in addition to acting as lubricants may also serve to impart improved impact resistance to the molded composition. Suitable lubricating polymers include the sodium and zinc salts of copolymers of alpha-olefins and alpha-beta-ethylenically unsaturated carboxylic acids such as ethylene/acrylic acid, propylene/acrylic acid, ethylene/methacrylic acid, propylene/methacrylic acid and the like; polysiloxanes such as polydimethylsiloxane, polydiethylsiloxane and the like; polyolefins such as polyethylene, polypropylene and the like; polyethylene copolymers containing from 2–7% of epoxy groups; ethylene/alpha-olefin/diene (EPDM) copolymers such as ethylene/propylene/1,4-hexadiene, ethylene/propylene/dicyclopentadiene, ethylene/propylene/5-ethylidene-2-norbornene and the like; maleic anhydride adducts of EPDM copolymers; polyamides such as polycaprolactams, polylaurolactam, polyhexamethylene adipamide and the like; and polymers of vinyl aromatic hydrocarbons such as polystyrene, polyalphamethylstyrene and the like. The preferred lubricating polymers are the sodium or zinc salts of copolymers of alpha-olefins and alpha-beta-ethylenically unsaturated carboxylic acids.

The amounts of lubricating polymer utilized in the molding composition may vary considerably depending on desired properties. Suitable amounts may range from about 0.5 to about 10.0 parts by weight per 100 parts by weight of total composition. Preferred amounts range from 1.0 to 5.0 parts by weight per 100 parts by weight of total composition.

Various nucleating agents may be utilized in the compositions of the invention. Suitable nucleating agents which may be employed include calcium salts such as calcium terephthalate, calcium titanate, calcium pyrophosphate, calcium silicate, calcium benzoate, calcium oxide, calcium carbonate, calcium fluoride and the like; sodium silicate and sodium phenyl phosphenate and zeolites such as sodium aluminosilicate, calcium aluminosilicate, hydrous aluminosilicate, zinc borate and the like. In addition, certain materials which are ordinarily used as fillers such as the mineral silicates, talc, clay, silica and mica may also act as nucleating agents. The preferred nucleating agents are the calcium salts and of these calcium silicate is especially preferred.

Amounts of nucleating agent which may be present in the composition can range from about 0.1 to about 5.0 parts by weight per 100 parts by weight of total composition. Preferred amounts range from 0.5 to 3.0 parts by weight per 100 parts by weight of total composition.

Any of the reinforcing and filler materials heretofore utilized in preparing polyethylene terephthalate molding compositions may be employed in the compositions of the invention. The preferred reinforcing material is glass fibers. Filler materials which may be employed include mica, clay, talc and vermiculite. It is often desirable to use a mixture of reinforcing material and filler such as a mixture of glass fibers and mica.

Amounts of reinforcing material or mixture of reinforcing material and filler which may be present in the composition can range from about 20 to about 60 parts by weight per 100 parts by weight of total composition. Preferred amounts range from 25 to 50 parts by weight per 100 parts by weight of total composition.

As indicated, the compositions of the invention also contain a molecular weight reducing agent for the polyethylene terephthalate resin. This is an extremely important aspect of the compositions of the invention. Thus, the addition of a molecular weight reducing agent to the compositions of the invention provides a means for readily controlling the molecular weight of the polyethylene terephthalate in order to obtain the optimum molecular weight required for excellent molding characteristics. Molecular weight reducing agents which may be utilized in the compositions include benzoic acid, neopentyl glycol and water. The preferred molecular weight reducing agent is benzoic acid.

The amounts of molecular weight reducing agent to be utilized in the compositions is in general dependent upon the intrinsic viscosity of the original polyethylene terephthalate resin. In general, the amount of molecular weight reducing agent added to the composition should be sufficient to achieve an intrinsic viscosity in the molded polyethylene terephthalate composition of from about 0.48 to about 0.52 dl/g as measured at 25° C. in a 1:1 phenol/tetrachloroethane solution. Suitable amounts of molecular weight reducing agent employed in the composition may range from about 0.01 to about 1.0 parts by weight per 100 parts by weight of total composition. Preferred amounts range from 0.01 to 0.5 parts by weight of total composition.

In addition to the above components, the compositions of the invention may contain other special purpose additives such as antioxidants, ultraviolet absorbers, antistatic agents, flame retardants, dyes, pigments (e.g., carbon black, titanium dioxide, etc.) and other fillers conventionally employed in molding compositions. The flame retardants may be of the metallic compound type (e.g., antimony trioxide, zinc molybdate, zinc oxide, zinc borate, clay, talc, mica, etc.) or the halogenated compound type (e.g., decabromophenylether, ethylene-bis-3,4,5,6-tetrabromophthalimide, etc.) or mixtures thereof. A preferred flame retardant mixture is a mixture of zinc borate and decabromophenylether or ethylene-bis-3,4,5,6-tetrabromophthalimide.

In instances where other known fillers are to be included in the composition of the invention, these may be utilized in amounts of from about 20 to about 50 parts by weight per 100 parts by weight of total composition. In instances where it is desired to include metallic compound flame retardants in the composition, these may be utilized in amounts of from about 0.2 to about 8 parts by weight per 100 parts by weight of total composition. In instances where it is desired to include halogenated compound flame retardants in the composition, these may be utilized in amounts of from about 6 to about 16 parts by weight per 100 parts by weight of total composition. The preferred flame retardant mixture can be utilized in amounts of from about 8 to about 14 parts by weight of decabromophenylether or ethylene-bis-3,4,5,6-tetrabromophthalimide and from about 0.2 to about 6 parts by weight of zinc borate per 100 parts by weight of total composition.

The compositions of the invention can be prepared and molded using any conventional or well known method. The preferred method which is employed in a number of the examples herein involves melt blending the composition components in a twin screw extruder, chopping the extruded composition into pellets and then injection molding the pelleted composition into a conventional injection mold having a mold temperature of 100° C. or less.

Another method which is employed in a number of the examples herein involves melt blending the composition components in a Brabender Plasticorder and then transfer molding the blended compositions. This method has several disadvantages which limits its usefulness. Thus, only small quantities of composition can be prepared and molded using the method. Moreover, the ultimate strength values of molded compositions prepared by the method are generally about 50% less than those prepared by the preferred method. Nevertheless, this method has value as a screening procedure for evaluating compositional variations, particularly if the effect of the method on ultimate strength properties is kept in mind. Additionally, it has been found that the energy at break values of molded compositions prepared by this method can be utilized in many cases to determine whether the compositions would exhibit acceptable strength properties if prepared and molded by the preferred method. Thus, it has been found that in most instances if molded compositions prepared by the method approach or exceed 100 psi, the composition will exhibit acceptable strength values when prepared and molded by the preferred method.

The following examples are submitted for the purpose of further illustrating the nature of the present invention and are not intended as a limitation on the scope thereof. Parts and percentages referred to in the examples are by weight unless otherwise indicated.

EXAMPLES 1-28

These examples illustrate compositions of the invention prepared and molded using the screening procedure referred to above. In these examples, the compositions were prepared by melt blending the polyethylene terephthalate (hereinafter PET) and other components in a Brabender Plasticorder for 10 minutes following which the blended compositions were transfer molded in a Carver press. The molded compositions were then tested for various properties. Composition formulations and test results are shown in Tables I-VI.

TABLE I

| Example No. | 1 | 2 | 3 | 4 | 5 |
|---|---|---|---|---|---|
| Ingredients | | | | | |
| PET[a] | 62.12 | 62.12 | 62.12 | 62.12 | 62.12 |
| Surlyn 1559[b] | 5.12 | 3.50 | — | 3.50 | 3.50 |
| Styron[c] | — | — | 3.50 | — | — |
| Neopentyl glycol dibenzoate[d] | 2.35 | — | 2.40 | 2.40 | 2.40 |
| Trixylyl phosphate[d] | — | 2.40 | — | — | — |
| Calcium fluoride[e] | 2.01 | — | — | — | — |
| Calcium phosphate[e] | — | — | — | 1.79 | — |
| Calcium silicate[e] | — | 1.79 | 1.79 | — | 1.79 |
| Benzoic acid[f] | 0.26 | 0.26 | 0.26 | 0.26 | — |
| Neopentyl glycol[f] | — | — | — | — | 0.22 |
| Chopped glass fibers (¼" fibers) | 28.40 | 29.93 | 29.93 | 29.93 | 29.97 |
| | 100.26 | 100.00 | 100.00 | 100.00 | 100.00 |
| Properties | | | | | |
| Flex strength × 10$^{-3}$, psi | 17.4 | 16.4 | 16.2 | 14.8 | 18.3 |
| Flex modulus × 10$^{-6}$, psi | 0.93 | 0.95 | 1.11 | 1.01 | 0.94 |
| Max. strain, % | 2.05 | 1.88 | 1.55 | 1.63 | 2.21 |
| Energy at break, psi | 181 | 161 | 128 | 123 | 209 |
| Molded viscosity (I.V.), dl/g | 0.55 | 0.63 | 0.60 | 0.61 | 0.58 |

[a]intrinsic viscosity (I.V.) = 0.94 dl/g
[b]sodium ionomer of polyethylene and methacrylic acid available from duPont Company
[c]a polystyrene homopolymer available from Dow Chemical Company
[d]plasticizer
[e]nucleating agent
[f]molecular weight reducing agent for PET

TABLE II

| Example No. | 6 | 7 | 8 | 9 | 10 |
|---|---|---|---|---|---|
| Ingredients | | | | | |
| PET[a] | 62.12 | 62.12 | 63.76 | 63.76 | 63.76 |
| Polyethylene (2% epoxy)[b] | 3.50 | — | — | — | — |
| Polyethylene (7% epoxy)[c] | — | 3.50 | — | — | — |
| Surlyn 1559 | — | — | 3.54 | 3.54 | 3.54 |
| Neopentyl glycol dibenzoate | 2.40 | 2.40 | 2.44 | 2.44 | 2.44 |
| Calcium silicate | 1.79 | 1.79 | — | — | — |
| Mica | — | — | 1.80 | — | — |
| Zeolite[d] | — | — | — | 1.80 | — |
| Kaolin clay | — | — | — | — | 1.80 |
| Benzoic acid | 0.21 | 0.21 | 0.26 | 0.26 | 0.26 |
| Chopped glass fibers | 29.98 | 29.98 | 28.20 | 28.20 | 28.20 |
| | 100.00 | 100.00 | 100.00 | 100.00 | 100.00 |
| Properties | | | | | |
| Flex strength × 10$^{-3}$, psi | 16.6 | 14.1 | 16.6 | 16.7 | 20.9 |
| Flex modulus × 10$^{-6}$, psi | 0.97 | 0.88 | 1.29 | 1.22 | 1.26 |
| Max. strain, % | 1.90 | 1.78 | 1.38 | 1.45 | 1.77 |
| Energy at break, psi | 160 | 130 | 121 | 123 | 188 |
| Molded viscosity (I.V.), dl/g | 0.56 | 0.60 | 0.50 | 0.52 | 0.55 |

[a]I.V. = 0.93 to 0.94 dl/g
[b]polyethylene containing 2% epoxy groups available from Sumitomo Chemical Company
[c]polyethylene containing 7% epoxy groups available from Sumitomo Chemical Company
[d]calcium aluminosilicate

TABLE III

| Example No. | 11 | 12 | 13 | 14 | 15 |
|---|---|---|---|---|---|
| Ingredients | | | | | |
| PET[a] | 63.76 | 63.76 | 63.76 | 62.12 | 62.12 |
| Surlyn 1559 | 3.54 | 3.54 | — | 3.48 | 3.48 |
| Surlyn 1554[b] | — | — | 3.54 | — | — |
| Neopentyl glycol dibenzoate | 2.44 | 2.44 | 2.44 | — | — |
| Butyl benzyl phthalate | — | — | — | 2.40 | — |
| Dioctyl phthalate | — | — | — | — | 2.40 |

TABLE III-continued

| Example No. | 11 | 12 | 13 | 14 | 15 |
|---|---|---|---|---|---|
| Fumed silica | 1.80 | — | — | — | — |
| Vermiculite | — | 1.80 | — | — | — |
| Calcium silicate | — | — | 1.80 | — | — |
| Sodium silicate | — | — | 0.18 | — | — |
| Calcium phosphate | — | — | — | 0.38 | 0.38 |
| Calcium fluoride | — | — | — | 1.47 | 1.47 |
| Benzoic acid | 0.26 | 0.26 | 0.08 | 0.13 | 0.26 |
| Chopped glass fibers | 28.20 | 28.20 | 28.20 | 30.02 | 29.89 |
| | 100.00 | 100.00 | 100.00 | 100.00 | 100.00 |
| Properties | | | | | |
| Flex strength × $10^{-3}$, psi | 17.0 | 19.5 | 16.9 | 12.8 | 14.0 |
| Flex modulus × $10^{-6}$, psi | 1.19 | 1.19 | 1.07 | 1.02 | 1.13 |
| Max. strain, % | 1.51 | 1.79 | 1.75 | 1.52 | 1.37 |
| Energy at break, psi | 133 | 182 | 149 | 103 | 101 |
| Mold viscosity (I.V.), dl/g | 0.54 | 0.54 | 0.59 | 0.46 | 0.44 |

(a) I.V. of PET for Examples 11–13 is 0.93 dl/g,; for Example 14 is 0.59 dl/g and for Example 15 is 0.94 dl/g
(b) zinc ionomer of polyethylene and methacrylic acid available from duPont Company

TABLE IV

| Example No. | 16 | 17 | 18 | 19 | 20 |
|---|---|---|---|---|---|
| Ingredients | | | | | |
| PET(a) | 55.70 | 62.12 | 62.30 | 62.12 | 62.12 |
| EPDM(b) | 9.87 | 3.50 | — | — | — |
| EPDM/MA(c) | — | — | 3.50 | — | — |
| Surlyn 1559 | — | — | — | 3.48 | 3.50 |
| Neopentyl glycol dibenzoate | 2.40 | — | 2.40 | 2.40 | 2.40 |
| Pentaerythritol tetrabenzoate | — | 2.40 | — | — | — |
| NYAD-G(d) | 1.79 | 1.88 | 1.80 | — | — |
| Calcium carbonate | — | — | — | 1.74 | — |
| Zinc borate | — | — | — | — | 1.79 |
| Benzoic acid | 0.21 | 0.26 | 0.20 | 0.26 | — |
| Water | — | — | — | — | 0.03 |
| Chopped glass fibers | 29.89 | 30.00 | 30.00 | 30.00 | 30.19 |
| | 99.86 | 100.16 | 100.20 | 100.00 | 100.03 |
| Properties | | | | | |
| Flex strength × $10^{-3}$, psi | 5.30 | 11.50 | 18.70 | 14.60 | 15.60 |
| Flex modulus × $10^{-6}$, psi | 0.66 | 1.06 | 1.25 | 0.82 | 1.04 |
| Max. strain, % | 1.00 | 1.33 | 1.69 | 1.91 | 1.66 |
| Energy at break, psi | 30* | 81 | 165 | 139 | 133 |
| Notched Izod, 1/4" bar, ft. lbs./in. | — | — | 1.31 | — | — |
| Molded viscosity (I.V.), dl/g | — | 0.38 | 0.36 | 0.65 | 0.60 |

(a) I.V. of PET for Examples 16 and 18 is 0.93 dl/g, For Example 17 is 0.71 dl/g and for Examples 19 and 20 is 0.94 dl/g.
(b) an ethylene/propylene diene monomer terpolymer available from duPont Company under the designation Nordel
(c) a maleic anhydride adduct of the EPDM terpolymer containing 0.53% by weight of maleic anhydride
(d) calcium silicate
*low energy at break value believed due to very low molded viscosity (not measured) caused by combination of high EPDM level and excessive water absorption. Note Example 17 having higher energy at break value. If the compositions were prepared by preferred process, it is believed that the value would be much higher and acceptable.

TABLE V

| Example No. | 21 | 22 | 23 | 24 |
|---|---|---|---|---|
| Ingredients | | | | |
| PET(a) | 45.67 | 45.67 | 59.43 | 59.43 |
| Surlyn 1559 | 2.54 | 2.54 | 2.11 | 2.11 |
| Neopentyl glycol dibenzoate | 1.76 | 1.76 | 1.45 | 1.45 |
| Calcium silicate | 1.29 | — | — | — |
| Talc | — | 1.29 | — | — |
| Mica | — | — | 10.00 | 10.00 |
| Benzoic acid | — | — | 0.08 | 0.08 |
| Water | 0.03 | 0.03 | — | — |
| Chopped glass fibers | 48.74 | 48.74 | 25.00 | 23.20 |
| | 100.03 | 100.03 | 98.07 | 96.27 |
| Properties | | | | |
| Flex strength × $10^{-3}$, psi | 22.4 | 22.5 | 15.9 | 19.6 |
| Flex modulus × $10^{-6}$, psi | 1.61 | 1.63 | 1.14 | 1.25 |
| Max. strain, % | 1.67 | 1.65 | 1.53 | 1.86 |
| Energy at break, psi | 199 | 196 | 126 | 199 |
| Molded viscosity (I.V.), dl/g | 0.53 | 0.60 | 0.57 | 0.50 |

(a) I.V. = 0.93 dl/g

Examples 25–28 in Table VI illustrate flame retardant compositions of the invention.

TABLE VI

| Example No. | 25 | 26 | 27 | 28 |
|---|---|---|---|---|
| Ingredients | | | | |
| PET(a) | 54.20 | 54.20 | 54.20 | 54.20 |
| Surlyn 1559 | 3.01 | 3.01 | 3.01 | 3.01 |
| Neopentyl glycol dibenzoate | 1.32 | 1.32 | 1.32 | 1.32 |
| Zinc borate | 3.18 | 3.18 | 1.66 | 1.66 |
| Calcium silicate | — | — | 1.52 | 1.52 |
| Decabromophenylether | 9.56 | — | 9.56 | — |
| Ethylene-bis-3,4,5,6-tetrabromophthalimide | — | 9.56 | — | 9.56 |
| Water | 0.03 | 0.03 | 0.03 | 0.03 |
| Chopped glass fibers | 28.73 | 28.73 | 28.73 | 28.73 |
| | 100.03 | 100.03 | 100.03 | 100.03 |
| Properties | | | | |
| Flex strength × $10^{-3}$, psi | 16.4 | 12.96 | 20.06 | 18.16 |
| Flex modulus × $10^{-6}$, psi | 1.17 | 0.90 | 1.05 | 1.14 |
| Energy at break | 128 | 96 | 190 | 158 |
| Molded viscosity (I.V.), dl/g | 0.50 | 0.64 | 0.69 | 0.57 |
| LOI(b) | 31.0 | — | 30.0 | — |
| UL 94, 1/8" | 0 | 0 | 0 | 0 |

(a) I.V. = 0.93 dl/g
(b) Limiting Oxygen Index

EXAMPLES 29–38

These examples illustrate compositions of the invention prepared and molded using the preferred procedure described above. In these examples, the compositions were prepared by melt blending the composition components in a Werner-Pfliederer ZSK53 twin screw extruder at 290° C. and then chopping the extrudate into pellets. The pellets were then injection molded into a Cincinnati Milicron molder having a mold temperature of 60°–90° C. The molded compositions were then tested for various properties. Composition formulations and test results are shown in Tables VII and VIII.

TABLE VII

| Example No. | 29 | 30 | 31 | 32 | 33 |
|---|---|---|---|---|---|
| Ingredients | | | | | |
| PET(a) | 62.30 | 62.10 | 62.30 | 62.30 | 62.30 |
| Surlyn 1559 | 3.50 | 3.50 | 3.50 | 3.50 | 3.50 |
| Neopentyl glycol dibenzoate | 2.40 | 2.40 | 2.40 | 2.40 | 2.40 |
| Calcium silicate | 1.80 | 1.80 | — | — | — |
| Calcium fluoride | — | — | 1.80 | — | 1.80 |
| Mica | — | — | — | 1.80 | — |
| Benzoic acid | — | 0.20 | — | — | — |
| Water | 0.03 | — | 0.04 | 0.04 | 0.04 |
| Chopped glass fibers* | 30.00 | 30.00 | 30.00 | 30.00 | 30.00 |
| | 100.03 | 100.00 | 100.04 | 100.04 | 100.04 |
| Properties | | | | | |
| Flex strength × $10^{-3}$, psi | 32.7 | 34.3 | 28.6 | 36.4 | 27.0 |
| Flex modulus × $10^{-6}$, psi | 1.44 | 1.58 | 1.55 | 1.53 | 1.25 |

TABLE VII-continued

| Example No. | 29 | 30 | 31 | 32 | 33 |
|---|---|---|---|---|---|
| Tensile strength × $10^{-3}$, psi | 23.8 | 25.2 | 22.7 | 26.2 | 19.3 |
| Tensile % elongation | 1.98 | 1.78 | 2.00 | 2.13 | 1.82 |
| Energy at break, psi | 365 | 324 | 280 | 416 | 260 |
| Notched Izod, ¼" bar, ft. lbs./in. | 1.54 | 1.76 | 1.57 | 1.63 | 1.24 |
| Heat distortion temp. °C. at 264 psi | 233 | 237 | 232 | 237 | 230 |
| Molded viscosity (I.V.), dl/g | 0.54 | 0.49 | 0.50 | 0.46 | 0.49 |

$^{(a)}$I.V. = 0.91 dl/g
*Examples 29 through 32 contain PPG 3540 ¼" fibers, Example 33 contains PPG 3080 ¼" fibers.

TABLE VIII

| Example No. | 34 | 35 | 36 | 37 | 38 |
|---|---|---|---|---|---|
| Ingredients | | | | | |
| PET$^{(a)}$ | 62.30 | 62.30 | 62.30 | 62.30 | 62.30 |
| Surlyn 1559 | 3.50 | 3.50 | 3.50 | 3.50 | 3.50 |
| Neopentyl glycol dibenzoate | 2.40 | 2.40 | 2.40 | 2.40 | — |
| Glycerol tribenzoate | — | — | — | — | 2.40 |
| Calcium fluoride | 1.80 | — | — | — | 1.80 |
| Talc (8 μm) | — | 1.80 | — | — | — |
| Talc (3 μm) | — | — | 1.80 | — | — |
| Kaolin clay | — | — | — | 1.80 | — |
| Water | 0.04 | 0.04 | 0.04 | 0.04 | 0.04 |
| Chopped glass fibers* | 30.00 | 30.00 | 30.00 | 30.00 | 30.00 |
| | 100.04 | 100.04 | 100.04 | 100.04 | 100.04 |
| Properties | | | | | |
| Flex strength × $10^{-3}$, psi | 30.8 | 34.6 | 36.2 | 28.9 | 29.5 |
| Flex modulus × $10^{-6}$, psi | 1.47 | 1.43 | 1.43 | 1.34 | 1.43 |
| Tensile strength × $10^{-3}$, psi | 23.1 | 25.1 | 26.2 | 22.0 | 16.3 |
| Tensile % elongation | 1.83 | 2.08 | 2.38 | 1.80 | 1.67 |
| Energy at break, psi | 285 | 380 | 416 | 273 | 209 |
| Notched Izod, ¼" bar, ft. lbs./in. | 1.39 | 1.60 | 1.65 | 1.09 | 1.29 |
| Heat distortion temp. °C. at 264 psi | 237 | 232 | — | — | 231 |
| Molded viscosity (I.V.), dl/g | 0.46 | 0.50 | 0.51 | 0.51 | 0.44 |

$^{(a)}$I.V. = 0.91 dl/g
*Example 34 contains Owens Corning Glass 419 ¼" fiber and Examples 35 through 38 contain PPG 3540 ¼" fiber.

We claim:

1. Polyethylene terephthalate molding compositions which can be molded at temperatures of 100° C. or less comprising:
   (a) from about 40 to about 70 parts by weight per 100 parts of total composition of a polyethylene terephthalate having an intrinsic viscosity of 0.4 to 1.0 dl/g as measured at 25° C. in a 1:1: mixture of phenol and tetrachloroethane;
   (b) from about 0.5 to about 5.0 parts by weight per 100 parts by weight of total composition of a plasticizer selected from the group consisting of benzoate esters of polyols, phthalate esters and phosphate esters;
   (c) from about 0.5 to about 10.0 parts by weight per 100 parts by weight of total composition of a lubricating polymer;
   (d) from about 0.1 to about 5.0 parts by weight per 100 parts by weight of total composition of a nucleating agent;
   (e) from about 20 to about 60 parts by weight per 100 parts by weight of total composition of a reinforcing material or mixture of reinforcing material and filler;
   (f) from about 0.01 to about 1.0 parts by weight per 100 parts by weight of total composition of a molecular weight reducing agent for said polyethylene terephthalate, wherein said molecular weight reducing agent is selected from the group consisting of benzoic acid, neopentyl glycol and water.

2. The composition of claim 1 wherein said benzoate ester is neopentyl glycol dibenzoate.

3. The composition of claim 1 wherein said lubricating polymer is a sodium or zinc salt of a copolymer of an alpha-olefin and an alpha-beta-ethylenically unsaturated carboxylic acid.

4. The composition of claim 3 wherein said lubricating polymer is the sodium or zinc salt of a copolymer of ethylene and methacrylic acid.

5. The composition of claim 1 wherein said nucleating agent is a calcium salt, a zeolite, or a mineral silicate.

6. The composition of claim 1 wherein said nucleating agent is calcium silicate, calcium fluoride or calcium carbonate.

7. The composition of claim 1 wherein said reinforcing material is glass fibers.

8. The composition of claim 1 wherein the molecular weight reducing agent is benzoic acid.

* * * * *

UNITED STATES PATENT AND TRADEMARK OFFICE
CERTIFICATE OF CORRECTION

PATENT NO. : 4,440,889
DATED : APRIL 3, 1984
INVENTOR(S) : WILLIAM L. HERGENROTHER ET AL.

It is certified that error appears in the above-identified patent and that said Letters Patent are hereby corrected as shown below:

COLUMN 3, LINE 68 - DELETE THE WORDS "ZINC BORATE"

COLUMN 4, LINE 1 - AFTER THE WORD "LIKE" AND BEFORE THE ".",

ADD THE WORDS --AND ZINC BORATE--

Signed and Sealed this

Twenty-sixth Day of February 1985

[SEAL]

Attest:

DONALD J. QUIGG

Attesting Officer    Acting Commissioner of Patents and Trademarks